US006934616B2

(12) United States Patent
Colburn et al.

(10) Patent No.: US 6,934,616 B2
(45) Date of Patent: Aug. 23, 2005

(54) SYSTEM FOR DETERMINING AN IMPLEMENT ARM POSITION

(75) Inventors: Stephen Colburn, Eureka, IL (US); Paul C. Pawelski, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 121 days.

(21) Appl. No.: 10/680,169

(22) Filed: Oct. 8, 2003

(65) Prior Publication Data

US 2004/0117095 A1 Jun. 17, 2004

Related U.S. Application Data

(63) Continuation-in-part of application No. 10/320,804, filed on Dec. 17, 2002, now Pat. No. 6,865,464.

(51) Int. Cl.[7] ............................................. G06F 19/00

(52) U.S. Cl. ............................................ 701/50; 37/414

(58) Field of Search ............................ 701/50; 414/697, 414/699; 172/2, 4, 4.5; 37/348, 395, 397, 414, 415, 907

(56) References Cited

U.S. PATENT DOCUMENTS

| | | | | | |
|---|---|---|---|---|---|
| 4,772,161 | A | * | 9/1988 | Nagao et al. | 409/148 |
| 5,188,502 | A | * | 2/1993 | Tonsor et al. | 414/700 |
| 5,282,136 | A | * | 1/1994 | Zui et al. | 701/50 |
| 5,549,166 | A | * | 8/1996 | Orbach et al. | 172/4 |
| 6,185,493 | B1 | * | 2/2001 | Skinner et al. | 701/50 |
| 6,225,574 | B1 | * | 5/2001 | Chang et al. | 177/139 |
| 6,246,939 | B1 | * | 6/2001 | Nozawa | 701/50 |
| 6,374,147 | B1 | * | 4/2002 | Rockwood | 700/69 |

OTHER PUBLICATIONS

Salcudean, S.E., et al., "Impedance Control of a Teleoperated Mini Excavator", ICAR '97, Monterey, CA, Jul. 7–9, 1997, pp. 19–25.

* cited by examiner

*Primary Examiner*—Gary Chin
(74) *Attorney, Agent, or Firm*—Finnegan, Henderson, Farabow, Garrett & Dunner

(57) ABSTRACT

A control system for determining a position of an implement arm having a work implement is disclosed. The implement arm includes mating components connected by at least one joint. The control system includes at least one position sensor operably associated with the implement arm and configured to sense positional aspects of the implement arm. It also includes at least one load sensor operably associated with the implement arm, and configured to sense the direction of loads applied to the at least one joint. A controller is adapted to calculate a position of the implement arm based on signals received from the at least one position and load sensor. The calculated position takes into account shifting of the implement arm caused by clearances existing at the at least one joint between the mating components of the implement arm.

20 Claims, 6 Drawing Sheets

SYSTEM FOR DETERMINING AN IMPLEMENT ARM POSITION

This application is a continuation-in-part application of U.S. application Ser. No. 10/320,804, filed Dec. 17, 2002now U.S. Pat. No. 6,865,464, incorporated in its entirety herein by reference.

TECHNICAL FIELD

This invention relates to a system and method for accurately determining a position of an implement arm of a work machine. More specifically, this disclosure relates to a method and system for determining the position of a work implement of an implement arm of a work machine taking into account clearances existing between mating components of the implement arm.

BACKGROUND

Work machines, such as excavators, backhoes, and other digging machines, may include implement arms having a distally located work implement. The separate components making up the implement arm may be coupled by pin connections forming a series of implement arm joints. The pin connections are formed by positioning a pin within aligned holes in adjacent components of the implement arm. The pin connections allow the adjacent components of the implement arm to pivot with respect to one another and together allow the implement arm to move through its full working motion.

Some work machines are equipped with computer systems capable of computing the position of the implement arm during operation. In particular, such computer systems may inform the operator of the vertical depth or horizontal distance from a reference point. The known computer systems typically input values received from sensors coupled to the implement arm into a simplified kinematics model of the implement arm to determine its position. For example, U.S. Pat. No. 6,185,493 to Skinner et al. discloses a system for controlling a bucket position of a loader. The Skinner et al. system includes position sensors that determine the vertical position of the boom of the implement arm and the pivotal position of the bucket. With these sensed values, the approximate position of the bucket can be calculated throughout its movement.

However, several sources of error may affect the accuracy of the implement arm position determined with existing computer systems. For example, if any part of the implement arm deviates from a simplified kinematics model, there will be a discrepancy between the actual position and the calculated position of the implement arm. One such deviation is introduced at the pin connections of the implement arm joints. The pins of the pin connections are typically loosely fit into the aligned holes in the implement arm components, thus forming pin clearances at the implement arm joints. These pin clearances allow the components of the implement arm to shift during operation. This shifting of the implement arm components is an aspect not taken into account in known implement arm position detecting systems.

This disclosure is directed toward overcoming one or more of the problems or disadvantages associated with the prior art.

SUMMARY OF THE INVENTION

In one aspect, the present disclosure is directed to a control system for determining a position of an implement arm having a work implement. The implement arm includes mating components connected by at least one joint. The control system includes at least one position sensor operably associated with the implement arm and configured to sense positional aspects of the implement arm. It also includes at least one load sensor operably associated with the implement arm and configured to sense the direction of loads applied to the at least one joint. A controller is adapted to calculate a position of the implement arm based on signals received from the at least one position sensor and the at least one load sensor. The calculated position takes into account shifting of the implement arm caused by clearances existing at the at least one joint between the mating components of the implement arm.

In another aspect, the present disclosure is directed to a method for determining a position of an implement arm having a work implement. The implement arm includes mating components connected by at least one joint. The method includes sensing a positional aspect of the implement arm with a position sensor, and sensing a directional aspect of loads applied to the at least one joint with a load sensor. A position of the implement arm is calculated based on signals received from the position sensor and the load sensor. Further, calculating the position includes taking into account shifting of the implement arm caused by clearances existing at the at least one joint between the mating components of the implement arm.

BRIEF DESCRIPTION OF THE DRAWINGS

The foregoing and other features and advantages of the invention will be apparent from the following more particular description of the invention, as illustrated in the accompanying drawings.

DETAILED DESCRIPTION

Figure 1:
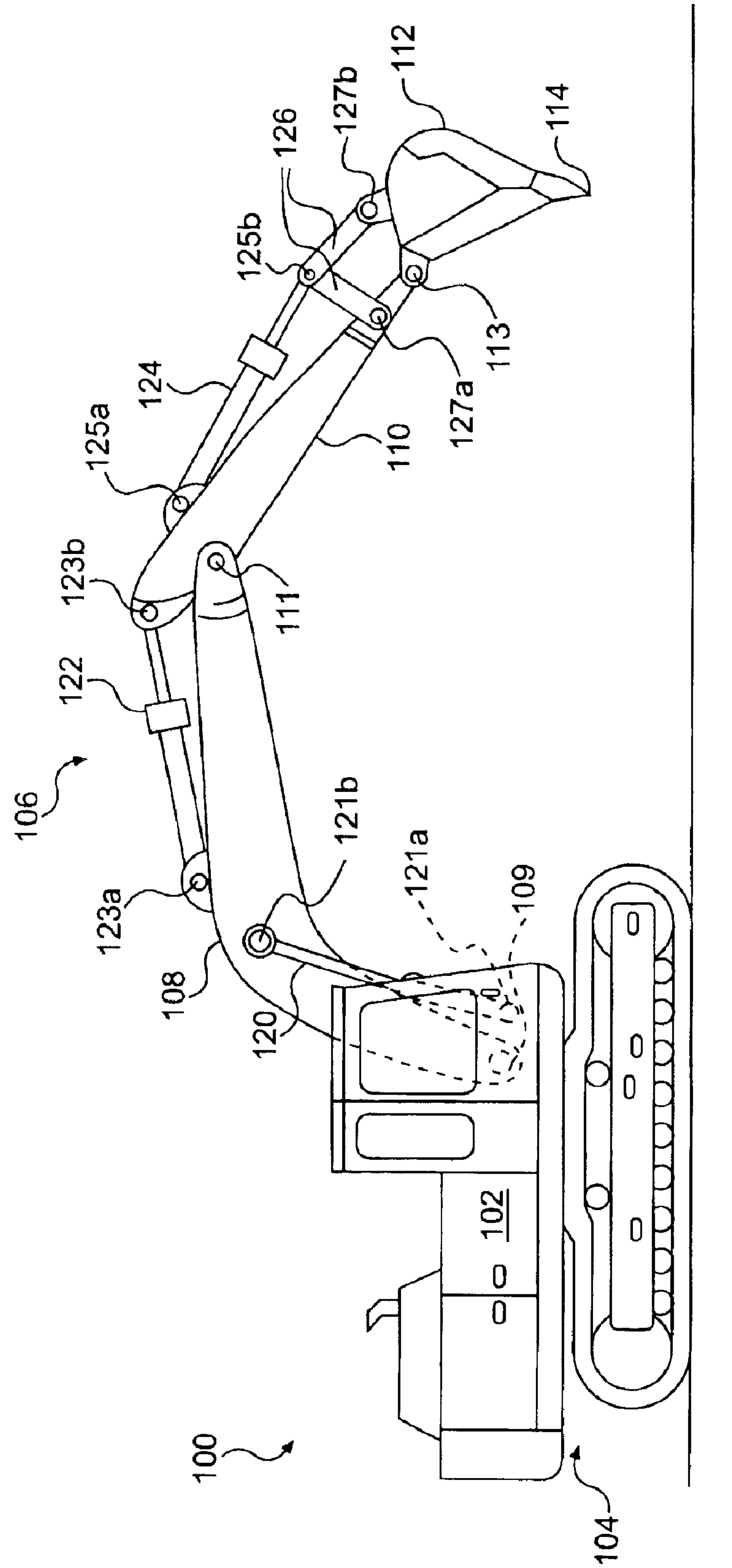
FIG. 1 is a diagrammatic side view of an excavator with an implement arm in accordance with an exemplary embodiment of the present disclosure.

FIG. 1 shows a exemplary work machine 100 having a housing 102 mounted on an undercarriage 104. Although in this exemplary embodiment the work machine 100 is shown as an excavator, the work machine 100 could be a backhoe or any other work machine. The work machine 100 includes an implement arm 106 having mating components, such as, for example, a boom 108, a stick 110, and a work implement 112. The boom 108 may be connected to the housing 102 at a pinned boom joint 109 that allows the boom 108 to pivot about the boom joint 109. The stick 110 may be connected to the boom 108 at a pinned stick joint 111, and the work implement 112 may be connected to stick 110 the at a pinned work implement joint 113. The work implement 112 may include a work implement tip 114 at the distal-most end of the implement arm 106.

Movement of the implement arm 106 may be achieved by a series of cylinder actuators 120, 122 and 124 coupled to the implement arm 106 as is known in the art. For example, a boom actuator 120 may be coupled between the housing 102 and the boom 108 by way of pinned boom actuator joints 121*a* and 121*b*. The boom actuator joints 121*a* and 121*b* are configured to allow the boom actuator 120 to pivot relative to the boom 108 and the housing 102 during movement of the boom 108.

A stick actuator 122 may be coupled between the boom 108 and the stick 110 by way of pinned stick actuator joints 123*a* and 123*b* to allow the stick actuator 122 to pivot relative to the boom 108 and stick 110 during movement of the stick 110. Further, a work implement actuator 124 may be coupled between the stick 110 and mechanical links 126 coupled to the work implement 112. The work implement actuator 124 may be connected to the stick 110 and mechanical links 126 at work implement actuator joints 125*a* and 125*b*, respectively. The mechanical links 126 may also include link joints 127*a*, 127*b* attaching the mechanical links 126 to the work implement 112 and the stick 110.

Figure 2:
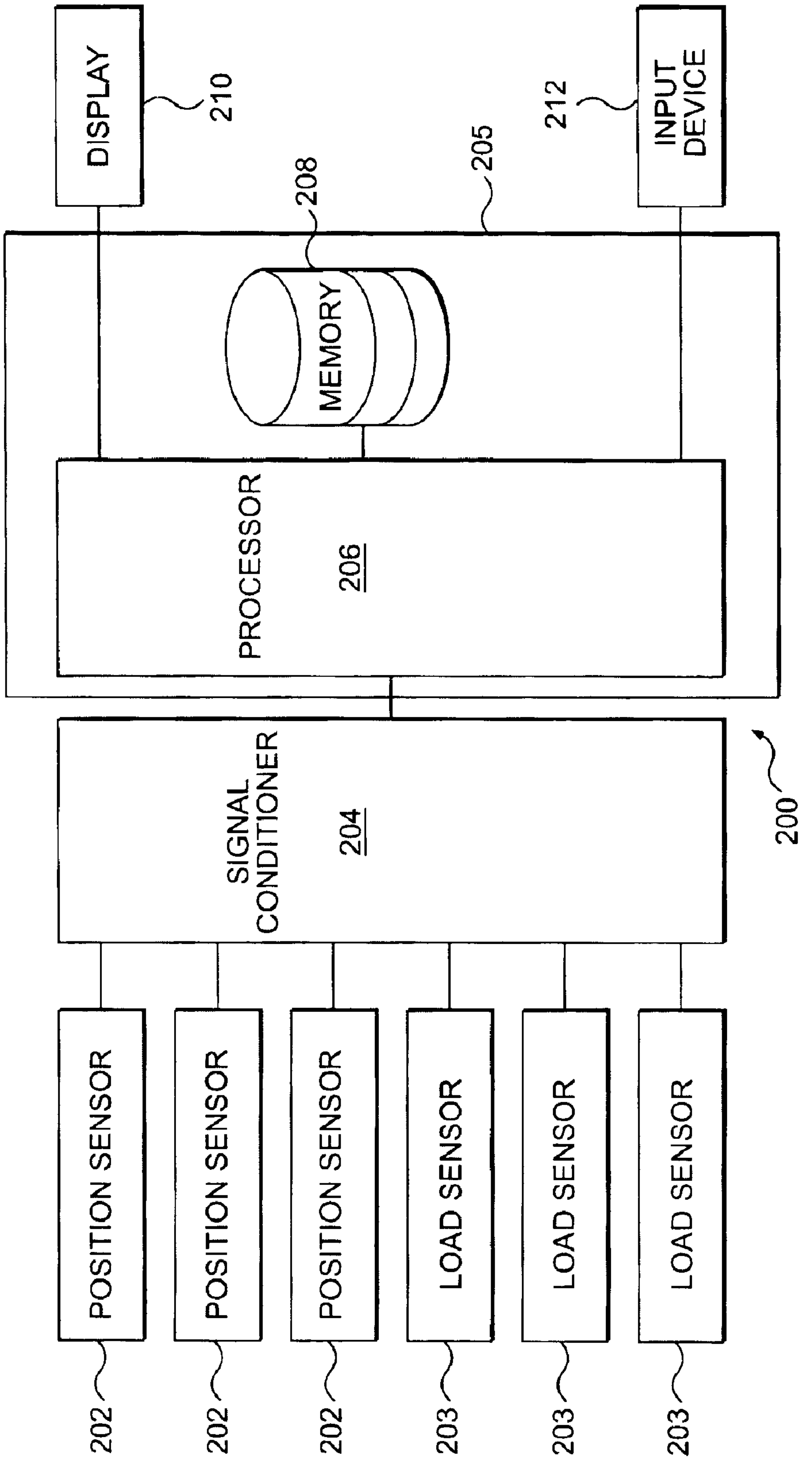
FIG. 2 is a block diagram of an exemplary electronic system according to the present disclosure.

FIG. 2 shows an exemplary electronic system 200, for determining a position of the implement arm 106, and in particular, a position of the work implement tip 114, relative to the work machine 100. The electronic system 200 may include one or more position sensors 202 for sensing the movement of various components of the implement arm 106. These sensors 202 may be operatively coupled, for example, to the actuators 120, 122, and 124. Alternatively, the position sensors 202 may be operatively coupled to the joints 109, 111, and 113 of the implement arm 106. The sensors could be, for example, length potentiometers, radio frequency resonance sensors, rotary potentiometers, angle position sensors or the like.

The electronic system 200 may also include one or more load sensors 203 for measuring external loads that may be applied to the implement arm 106. In one exemplary embodiment, the load sensors 203 may be pressure sensors for measuring the pressure of fluid within the boom actuator 120, stick actuator 122, and the work implement actuator 124. In this exemplary embodiment, two pressure sensors may be associated with each cylinder actuator 120, 122, 124, with one pressure sensor located within each end of each of the cylinder actuators 120, 122, 124.

In another exemplary embodiment, the load sensors 203 may be strain gauge sensors coupled to pin elements of the joints 109, 111, and 113 of the implement arm 106, and may be adapted to measure forces applied as loads to the implement arm 106. The pin elements may have holes bored to pass wires of the strain gauge sensors, and the strain gauge sensors may be used in pairs, and may be attached to either the exterior of the pin elements, or within the bores. Further, the pin elements may have a radial or linear groove to house the strain gauge sensors or may have a smaller diameter where the gauge sensors are located. This allows the pins to easily pass through pin holes, when necessary, while reducing the chance of scraping off the strain gauges. In one exemplary embodiment, a pin element may include two radial grooves, with four strain gauge sensors in each groove, or two pairs. The four strain gauge sensors may be offset 90 degrees from each other. In another exemplary embodiment, only two strain gauges are used, as a single pair, offset 90 degrees from each other. The strain gauge sensors may be associated with pin elements at each of the joints 109, 111, and 113, and placed to measure strain of the pin elements due to loads applied by the components of the implement arm 106.

The position sensors 202 and the load sensors 203 may communicate with a signal conditioner 204 for conventional signal excitation, scaling, and filtering. In one exemplary embodiment, each individual position and pressure sensor 202, 203 may contain a signal conditioner 204 within its sensor housing. In another exemplary embodiment, the signal conditioner 204 may be located remote from position and load sensors 202, 203.

The signal conditioner 204 may be in electronic communication with a controller 205. The controller 205 may be disposed on-board the work machine 100 or, alternatively, may be remote from the work machine 100 and in communication with the work machine 100 through a remote link.

The controller 205 may contain a processor 206 and a memory component 208. The processor 206 may be a microprocessor or other processor as is known in the art. The memory component 208 may be in communication with the processor 206, and may provide storage of computer programs, including algorithms and data corresponding to known aspects of the implement arm 106. As will be described in further detail below, the computer programs stored in the memory component 208 may include kinematics or geometric equations representing a kinematics model of the implement arm 106. The kinematics model may be capable of determining the angles and distances between the boom 108, the stick 110, and the work implement 112 of the implement arm 106 based upon the information obtained from the position sensors 202 and the load sensors 203.

A display 210 may be operably associated with the processor 206 of the controller 205. The display 210 may be disposed within the housing 102 of work machine 100, and may be referenced by the work machine operator. Alternatively, the display 210 may be disposed outside the housing 102 of the work machine 100 for reference by workers in other locations. The display 210 may be configured to provide, for example, information concerning the position of the implement arm 106 and/or implement tip 114.

The electronic system 200 may also include an input device 212 associated with the controller 205 for inputting information or operator instruction. The input device 212 may be used to signal the controller 205 when the implement arm 106 is positioned at a reference point for measuring the movement of the implement arm 106. The input device 212 could be any standard input device known in the art, including, for example, a keyboard, a keypad, a mouse, a touch screen, or the like.

INDUSTRIAL APPLICABILITY

As noted above, the electronic system 200 of the present disclosure determines a position of the implement arm 106, and in particular, the position of the implement tip 114. Knowledge of the position of the implement tip 114 during operation of the work machine 100 assists an operator in ensuring that the work implement 112 does not travel outside a desired work zone, such as below a desired vertical depth or outside a desired horizontal distance. As will be further described below in connection with FIG. 5, an operator of the work machine 100 may position the implement tip 114 at a desired location and identify that location as a reference point. With this reference point, electronic system 200 may provide information regarding the magnitude of vertical and horizontal movement of the implement tip 114 from the reference point.

The determination of the position of the implement tip 114 by electronic system 200 includes consideration of the shifting of various components of the implement arm 106 due to the pin clearances at the numerous joints 109, 111,113, 121$a$, 121$b$, 123$a$, 123$b$, 125$a$, 125$b$, 127$a$, and 127$b$ of the implement arm 106. Consideration of the shifting of components of the implement arm 106 provides for more accurate control of the work implement 112 during operation.

According to an exemplary embodiment of the disclosure, the electronic system 200 may use the above mentioned kinematics model and geometric software to determine the position of the work implement tip 114. In particular, the electronic system 200 may determine the position of the work implement tip 114 by determining necessary elements from which the angular rotation of the implement arm 106 may be identified. These necessary elements of the angular rotation may be, for example, force vectors and relative angles, and may be determined using, in a first embodiment, a static equilibrium analysis or, in a second embodiment, direct measurement. Regardless of which of the two methods is used, the electronic system 200 determines the angular rotations of the boom 108, stick 110 and work implement 112 resulting from the pin clearances at the joints 109, 111,113, 121$a$, 121$b$, 123$a$, 123$b$, 125$a$, 125$b$, 127$a$, and 127$b$ of the implement arm 106. The next step includes taking the angular rotations, the known lengths of the boom 108, stick 110 and work implement 112, and measured joint angles of the implement arm 106, and calculating the position of the work implement tip 114.

Figure 3:
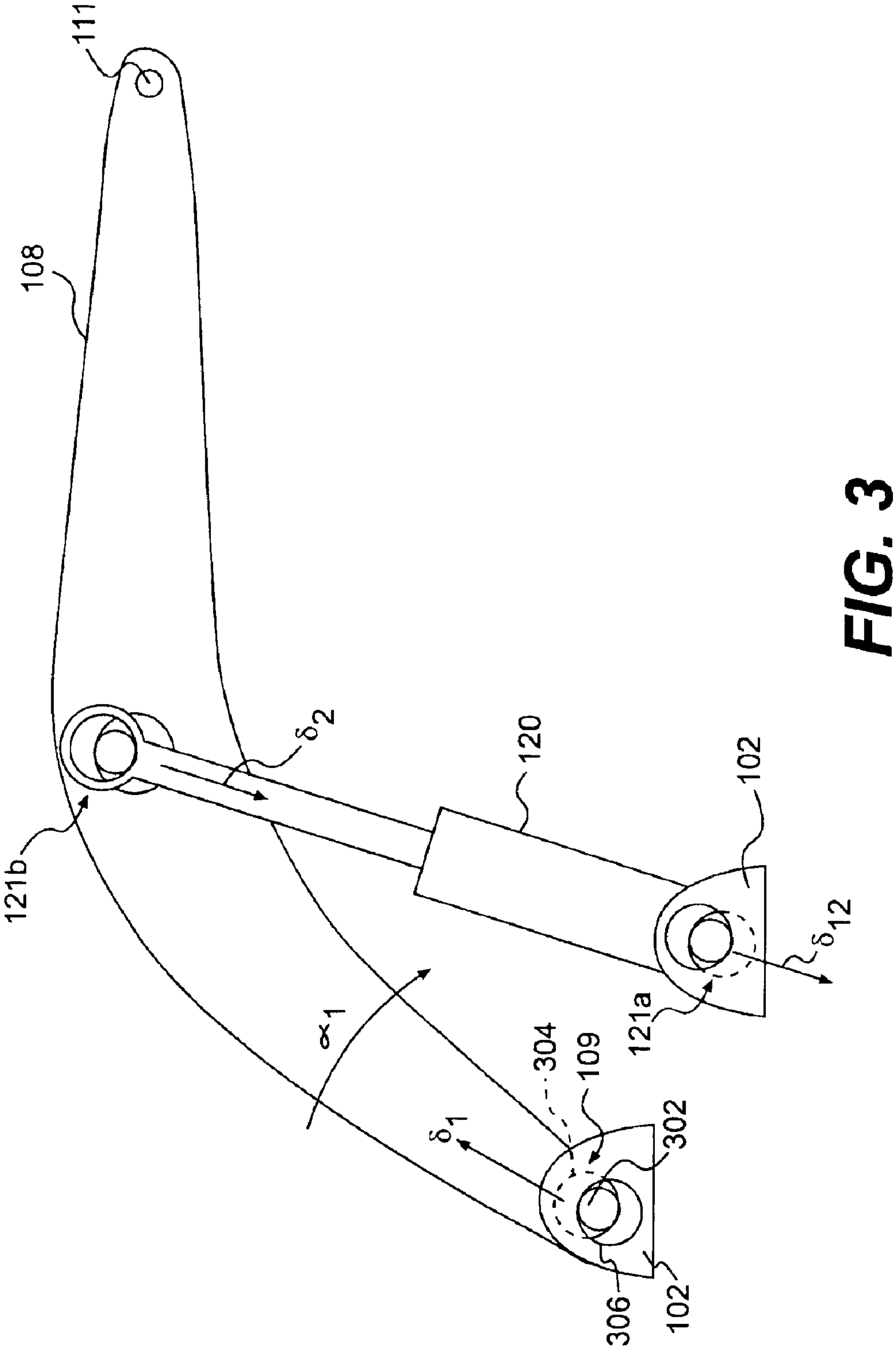
FIG. 3 is an enlarged diagrammatic side view of aspects of the implement arm of FIG. 1.

FIG. 3 illustrates the angular rotation of the boom 108 and its effect on the position of the work implement tip 114. More specifically, FIG. 3 illustrates the boom 108 and the direction of boom shift due to pin clearance at the boom joint 109 and the boom actuator joints 121$a$ and 121$b$. The movement of one component, such as the boom 108, relative to another component, such as the housing 102, is referred to herein as the shift $\delta$. The amount of shift $\delta$ at any joint, such as joints 109, 121$a$, 121$b$ of the implement arm 106, is related to the pin clearance. For example, in FIG. 3, the boom joint 109 connecting the boom 108 to the work machine housing 102 may include a boom pin 302 extending through a boom pin hole 304 and a housing pin hole 306. The boom pin hole 304 and the housing pin hole 306 may each have a larger diameter than the pin 302, thereby providing a pin clearance between the pin 302 and the holes 304, 306. This pin clearance allows the pin 302 to move within the holes 304, 306 and shift the boom 108 relative to the housing 102, represented by shift $\delta_1$. As shown in FIG. 3, pin clearance, and corresponding component shifting, may also exist at the boom actuator joint 121$a$, represented by shift $\delta_{12}$, and the boom actuator joint 121$b$, represented by shift $\delta_2$. In FIG. 3, the clearance between the pins and pin holes is exaggerated for clarity of explanation.

The amount of shift $\delta$ at any joint, such as joints 109, 121$a$, 121$b$ of the implement arm 106, is related to the pin clearance, and may be calculated by the controller 205 based on known values of the diameters of the pin (such as pin 302) and the two mating holes (such as boom pin hole 304 and housing pin hole 306) at each joint. Shift $\delta$ may be calculated using the formula below.

$$\delta = \frac{(D_{hole1} + D_{hole2} - 2D_{pin})}{2}$$

The shift $\delta$ of the boom 108 at the joints 109, 121$a$, 121$b$ of implement arm 106 causes the boom 108 to be angularly rotated. This angular rotation $\alpha_1$ of the boom 108 caused by the pin clearances displaces the distal most end of the boom

108 by some small amount. The angular rotation $\alpha_1$ varies depending on the position of the boom 108. Further, the angular rotation $\alpha_1$ changes the actual position of the boom 108 so that it varies from a standard kinematics model of the implement arm 106 that does not take into account the pin clearance effects. Accordingly, the angular rotation $\alpha_1$ of the boom 108 should be considered when determining the actual position of the implement arm 106. Similar to the boom 108, the stick 110 and the work implement 112 each include angular rotations $\alpha$ due to the shifting caused by pin clearances at the stick joint 111 and the work implement joint 113.

As stated above, the angular rotation $\alpha$ for the boom 108, the stick 110, and the work implement 112 may be determined by the controller 205 using necessary elements. These necessary elements may be determined using, in a first embodiment, a static equilibrium analysis or, in a second embodiment, by direct measurement. An explanation of the logic for determining the angular rotation using the static equilibrium analysis will be provided first, followed by an explanation of the logic for determining the angular rotation using direct measurement to obtain the necessary elements.

Figure 4:
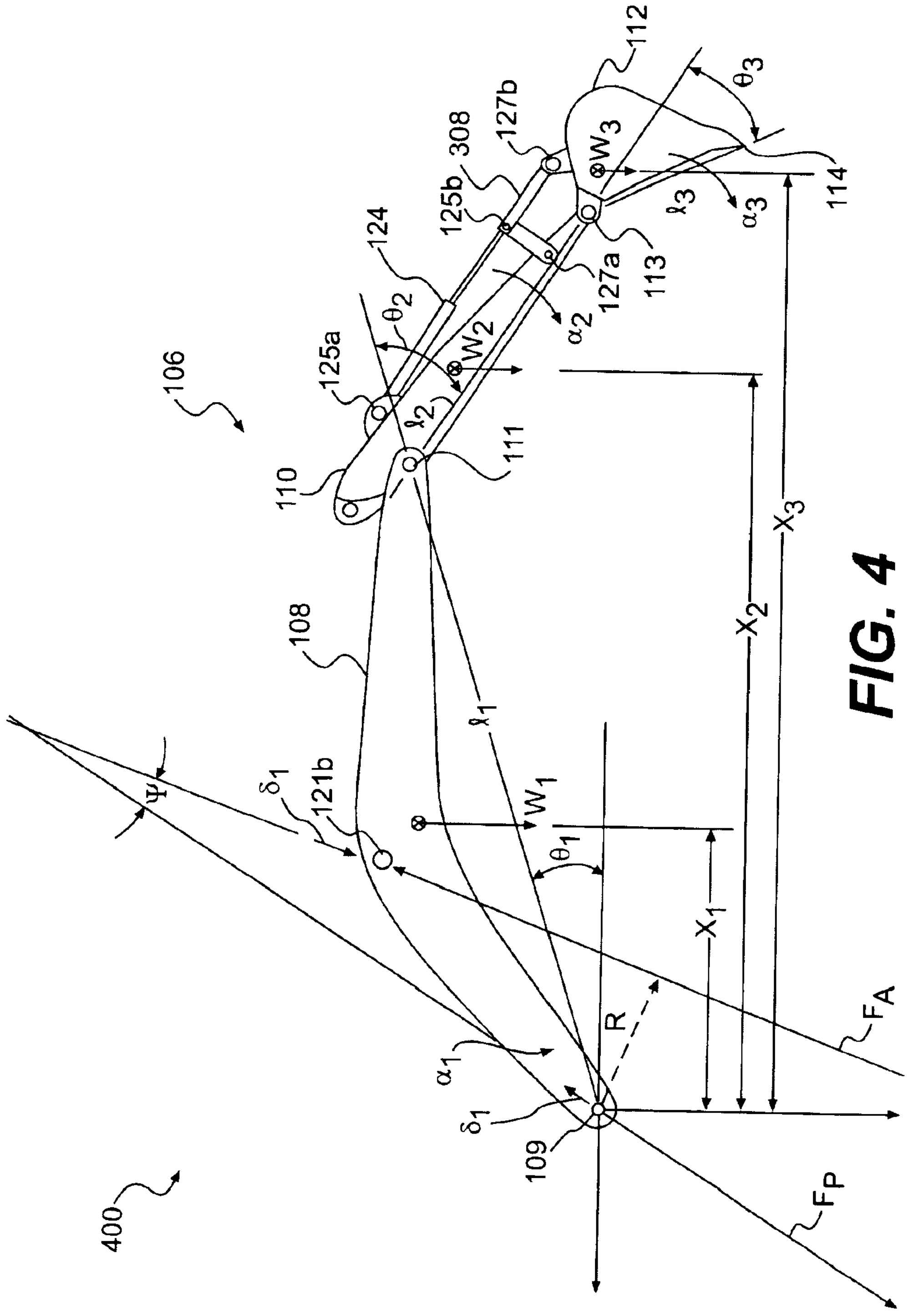
FIG. 4 is a diagrammatic side view of the implement arm of FIG. 1 with force and positional references relevant to aspects of the present disclosure.

First, the method and system for calculating the angular rotation $\alpha$ using the static equilibrium analysis will be explained. To explain this analysis, FIG. 4 shows a free body diagram 400 illustrating the necessary elements required to determine the angular rotation of the implement arm 106. In particular, FIG. 4 illustrates the force and positional references relevant to the static equilibrium analysis for determining the angular rotations $\alpha_1$, $\alpha_2$, and $\alpha_2$, of the boom 108, stick 110, and work implement 112, respectively.

The free body diagram 400 shows the relevant forces acting on the boom 108 of the work implement arm 106. These forces include, for example, a pin force $F_P$ and an actuator force $F_A$. The pin force $F_P$ acts on the boom 108 in the opposite direction of the shift $\delta_1$ and represents a moment force exerted by the boom 108 on the boom joint 109. The actuator force $F_A$ acts opposite the shift $\delta_2$ and represents a force applied by the boom actuator 120 to the boom actuator joint 121$b$.

The directions of the pin force $F_P$ and the actuator force $F_A$ form an angle $\Psi$. Because the pin force $F_P$ and the actuator force $F_A$ act in directions opposite the shifts $\delta_1$ and $\delta_2$, the angle $\Psi$ is also the angle formed between the direction of the shift $\delta_1$ and the direction of the shifts $\delta_2$ and $\delta_{12}$. The angle $\Psi$ may be considered when solving for the angular rotation $\alpha$. The controller 205 may solve for the value of angle $\Psi$ using a static equilibrium analysis based on the position of the implement arm 106 as measured by the position sensors 202 and based on other forces acting on the implement arm 106 as measured by the load sensors 203 and determined by the controller 205.

The static equilibrium analysis may also consider other forces acting on the implement arm 106. Weight forces $W_1$, $W_2$, and $W_3$, acting on the boom 108, the stick 110, and the work implement 112, respectively, may be known values, taken from specifications of the implement arm 106, and may be located at the center of gravity for each respective section of the implement arm 106. Distances from the boom joint 109 to the center of gravity of the boom 108, the stick 110, and the work implement 112 are represented as distances $X_1$, $X_2$, and $X_3$, respectively. The distances $X_1$, $X_2$, and $X_3$ may be referred to herein as distances from a known point to the center of gravity of the components, and may be determined by the controller 205 using known static analysis and kinematics methods based on the instantaneous readings of the sensors 202, 203. An effective radius R may represent the shortest distance between the boom joint 109 and the direction of the actuator force $F_A$, and may also be determined using standard geometric equations and considered by the controller 205 when calculating the angular rotation α at the boom joint 109.

As stated above, the direction of the shift $\delta_1$ at the boom joint 109 may be opposite to the direction of the pin force $F_P$. Using the shift δ from the boom joints 109, 121*a*, 121*b* and the angle Ψ, the controller 205 may determine the angular rotation $\alpha_1$ of the boom 108. The equation for the angular rotation is:

$$\alpha_1 = \frac{(\delta_{12} + \delta_2 + \delta_1 \cos\Psi)}{R}$$

where $\delta_1$ is the shift at the boom joint 109, $\delta_2$ is the shift at the boom-actuator joint 121*b*, and $\delta_{12}$ is the shift at the boom-actuator joint 121*a*. Once the angular rotation $\alpha_1$ of the boom joint 109 is known, the same analysis may be performed at the stick joint 111 and work implement joint 113 using free body diagrams to determine the angular rotation $\alpha_2$ of the stick 110 and the angular rotation $\alpha_3$ of the work implement 112.

The angular rotation $\alpha_3$ of the work implement 112 rotating about the work implement joint 113 may be simplified by neglecting the mass of the work implement actuator 124 and mechanical links 126. In so doing, the mechanical links 126 may be treated as two-force members, with the forces acting collinear along them. The angular rotation $\alpha_3$ of the work implement 112 may be determined by calculating the angular rotation at joints 125*a*, 125*b*, 127*a* first, followed by calculating the rotation at joints 113, 127*a* and 127*b*.

As stated above, in the second embodiment, the angular rotation α can also be determined directly by measuring elements required to calculate the angular rotation α, rather than conducting a static equilibrium analysis to determine the required forces. This embodiment may include the use of load pins. Load pins are pins adapted to measure loads applied to the pins. One embodiment of a load pin includes the load sensors 202, such as strain gauge sensors, associated with a pin, such as boom pin 302 in FIG. 3, to measure the strain on the pin due to forces applied by the components of the implement arm 106 at the joints 109, 111, and 113. When used to determine the angular rotation α of the implement arm 106, the information desired from the strain gauge sensors is merely the direction of the forces applied to the pin. The magnitude of the forces on the pins does not affect the amount of the pin shift because the pins can only shift within the pin holes. However, the direction of the shift is important in determining the angular rotation at the joints 109, 111, and 113. To ensure accuracy, the pins may be secured within the joints 109, 111, and 113 so that they do not rotate within the joints. So doing ensures that the strain gauge sensors measure the loads in the proper directions.

By comparing the amount and direction of strain measured by the two strain gauge sensors, or the two pairs of strain gauge sensors, the direction of the pin force $F_P$ applied at the joints can be easily determined using methods known in the art. The direction of the actuator force $F_A$ and the effective radius R may be determined using geometry, with known values, including the measured position or length of the actuators. The angle Ψ, which is the angle between the pin force $F_P$ and the actuator force $F_A$, may then be determined using known methods. Once these valued are obtained, the angular rotation α may be calculated for each joint using the equations for angular rotation α set forth above.

Once the angular rotation α at joints 109, 111, and 113 is calculated using either a static equilibrium analysis or is calculated using the direct measurement of direction of forces measured by the load pins, the position of the implement arm 106 may be determined using standard geometric and kinematics equations. The equations may calculate the actual position of the work implement tip 114 in both the x and y directions. The equations may consider the lengths of the boom 108, the stick 110, and the work implement 112 ($l_1$, $l_2$, and $l_3$, respectively) between the boom joint 109, the stick joint 111, the work implement joint 113, and the work implement tip 114. Joint angles $\theta_1$, $\theta_2$, and $\theta_3$, formed between the boom 108, stick 110, and work implement 112 may also be considered in the equations. The joint angles $\theta_1$, $\theta_2$, and $\theta_3$ may be determined by the kinematics equations stored in the controller 205 based upon information obtained from the position sensors 202, which may include angle position sensors. Finally, the angular rotations $\alpha_1$, $\alpha_2$, and $\alpha_3$, may be included in the equations for determining the actual position of the work implement tip 114. The equations for calculating the actual position of the work implement tip 114 in both the x and y directions are set forth below.

$$x_{tip} = l_1 \cos(\theta_1+\alpha_1) + l_2 \cos(\theta_1+\theta_2+\alpha_1+\alpha_2) + l_3 \cos(\theta_1+\theta_2+\theta_3+\alpha_1+\alpha_2+\alpha_3)$$

$$y_{tip} = l_1 \sin(\theta_1+\alpha_1) + l_2 \sin(\theta_1+\theta_2+\alpha_1+\alpha_2) + l_3 \sin(\theta_1+\theta_2+\theta_3+\alpha_1+\alpha_2+\alpha_3)$$

The distance between two different positions of the implement arm 106 may be determined by calculating the position of the implement arm 106 at both of the positions, and then taking the difference between them to obtain the magnitude of horizontal and vertical movement. Angular movement of the implement arm 106 may be calculated from the horizontal and vertical movement.

In the static equilibrium analysis described above, the implement arm 106 is treated primarily as a cantilever system. Accordingly, the static equilibrium analysis may be used by the controller 205 when the implement arm is free of external loads, such as loads associated with the operation of the work implement 112 in the ground or in other mediums. The load sensors 203 may be used to determine whether external loads exist.

In the static equilibrium analysis, when external loads are applied against the implement arm 106, the controller 205 may determine the angular rotation α at the implement arm joints 109, 111, 113 taking into account the forces applied by the external loads. These additional forces may be determined by considering the distances and angles between the boom 108, the stick 110, and the work implement 112, and the measured loads as indicated by the pressure of the fluid within the cylinder actuators 120, 122, and 124 or the strain at the joints 109, 111, and 113. As noted above, the additional forces may include, for example, loads applied against the work implement 112 by the ground during digging and the weight of material held by the work implement 112. For example, if the implement arm 106 is supported at both the boom 108 and work implement 112, such as, for example, by the work machine 100 and the ground, the pin clearance effect due to the applied loads will differ from that of a cantilever model.

In this scenario, the controller 205 may consider a soil dig force on the work implement 112. For example, after an operator has dug a trench to near the desired depth, the operator may finish the excavation by moving the work implement 112 horizontally, removing thin layers of soil until a desired depth is reached. Under these controlled conditions, the soil dig force applied against the work implement 112 may be fairly constant, and may be estimated from known methods, such as, for example, Reece's equation.

Accordingly, in the static equilibrium analysis, the angular rotation α may be calculated for the given position of the implement arm 106 with the additional loads applied in the appropriate directions. In the direct measurement analysis, the angular rotations a may be determined for a given position using the described system and method, without additional factors. This is because the direct measurement analysis measures the direction of the forces, rather than calculates them.

The controller 205 may also be programmed to determine the pin clearance error of the implement arm 106 using a dynamic load analysis. The controller 205 may consider the acceleration, velocity, and inertia of the implement arm 106 during the digging process. In this exemplary embodiment, the applied loads may be from the ground against the work implement 112, or from the movement and rotation of the work implement 112 when loaded or unloaded. The change in position and load may be monitored by the position and load sensors 202, 203 and may be used when calculating the angular rotations a at the joints of the implement arm 106.

In each of the exemplary scenarios described above, the position of the implement arm 106 may be continuously calculated and displayed in real-time during operation. Accordingly, the operator may monitor the depth of an excavation from a reference point without stopping the digging process. It should be noted that programming for determining the position of implement arm 106 under different loading scenarios may be accomplished by a single program or multiple programs of controller 205.

Figure 5:
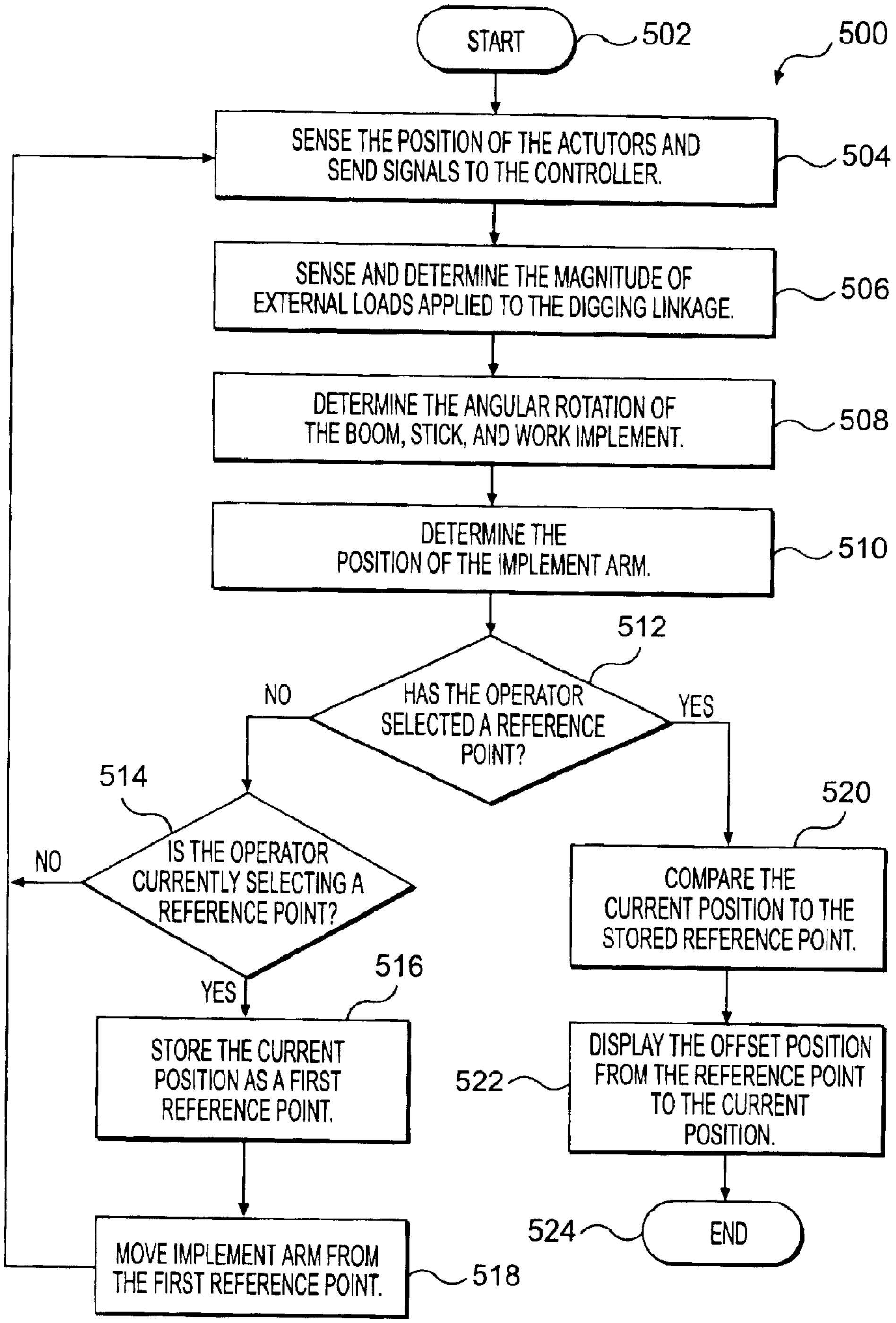
FIG. 5 is a flow chart of an exemplary method for determining implement arm movement according to the present disclosure.

In accordance with the above described methods for determining a position of the implement arm 106 of the work machine 100, FIG. 5 provides a flow chart 500 showing steps for determining a distance between a first and second positions of the implement arm 106. The method 500 may be performed by the controller 205. The method 500 starts at a start block 502 which may represent an initial powering of the electronic system 200 and/or work machine 100. This may occur during the ignition of the work machine 100 or at some other point in the powering of the work machine 100.

At a step 504, the position sensors 202 sense the actuators 122, 120, and 124. Signals representing the sensed position may be sent from the position sensors 202 to the controller 205. As explained above with reference to FIG. 2, the signals may have been altered by a signal conditioner prior to being received at the controller 205.

At a step 506, the load sensors 203 sense the pressure of fluid within the cylinder actuators 122, 120, and 124 or the forces against the pin joints 109, 111, and 113. Signals indicative of these pressures and forces are sent to the controller 205. The controller 205 may input the sensed pressure or force values, along with the sensed position values into a program routine to determine the magnitude of any external loads applied against the implement arm 106.

At a step 508, the controller 205 calculates the angular rotation α of the boom 108, the stick 110, and the work implement 112 taking into account the shifting of components of the implement arm caused by the pin clearance. As noted above, the angular rotation α may be based upon a static equilibrium analysis and/or dynamic load analysis as described with reference to FIG. 4, or based upon readings from load sensors that determine the direction of the pin shift. To perform the static equilibrium analysis, the controller 205 may first determine the distances $X_1$, $X_2$, and $X_3$ and the joint angles $\theta_1$, $\theta_2$, and $\theta_3$ formed between the boom 108, stick 110, and work implement 112 of the implement arm 106. The distances $X_1$, $X_2$, and $X_3$ and the joint angles $\theta_1$, $\theta_2$, and $\theta_3$ may be determined based on readings from the sensors 202, and may be calculated using standard kinematics and geometric equations.

Figure 6:
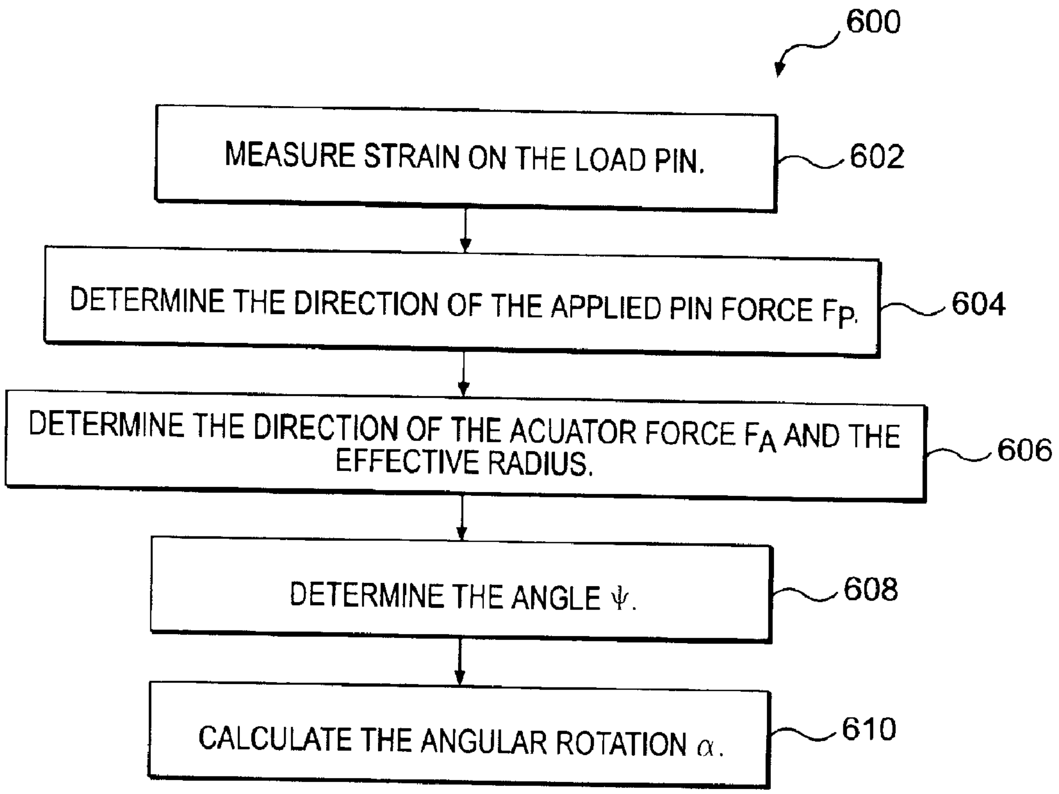
FIG. 6 is a flow chart of an exemplary method for determining an angular rotation of an implement arm according to the present disclosure.

Using the direct measurement analysis at step 508 allows the angular rotation α to be based upon readings from the load sensors 202 that determine the direction of pin shift. FIG. 6 is a flow chart 600 setting forth method steps for determining the angular rotation α using this approach. At a step 602, the strain applied to a pin, such as boom pin 302, due to loads at any of the joints 109, 111, and 113, is measured. A comparison of the strain as measured by either one or two pairs of load sensors 202, such as strain gauge sensors, placed 90 degrees apart enables the controller 205 to determine the direction of the applied load, and hence the direction of the pin force $F_P$, at a step 604. At a step 606, the direction of the actuator force $F_A$ and the effective radius R may be determined using geometry or kinematics. These calculations may be dependent on the length of the associated actuator, as measured by the position sensors 202. At a step 608, the controller 205 calculates the angle Ψ. The angle Ψ is the angle between the pin force $F_P$ and the actuator force $F_A$. Finally, at a step 610, the angular rotation α is calculated using the angular rotation equation set forth above.

Returning to FIG. 5, at a step 510, the controller 205 determines a position of the implement arm 106, based on the angular rotation α of the boom 108, the stick 110, and the work implement 112. The determined position includes the pin clearance effects, and, as such, more accurately represents the position of the implement arm 106.

At a step 512, the controller 205 determines whether the operator has selected a reference point. The reference point is a position of the implement arm that the controller 205 uses as a first measuring point. Accordingly, the distance that the implement arm 106 moves from the reference point becomes an offset distance from the reference point.

If the operator has not selected a reference point at step 512, the controller 205 determines whether the operator is in the process of selecting a reference point, at a step 514. If the operator is not in the process of selecting a reference point, the controller 205 returns to step 504, and monitors the movement of the implement arm 106, and continues to determine the position of the implement arm 106, as described in steps 504 through 510. If, at step 514, the operator is in the process of selecting a reference point, the controller 205 stores the current position of the implement arm 106 in the memory component 208 of the controller 205 as a first reference point, as set forth at a step 516. In one exemplary embodiment, the operator triggers the storing of the first position with a triggering switch or other signal to the controller 205. The signal indicates that the implement arm 106 is at the desired reference point. This triggering may be accomplished through the input device 212. As such, when the controller 205 is signaled to indicate that the implement arm 106 is at the reference point, the controller 205 may record and store the current position.

At a step 518, the operator may maneuver the implement arm 106 from the first reference point using methods known in the art. The controller 205 may return to step 504 to continue to sense and determine the current position of the implement arm 106, as described in steps 504 through 510.

If at step 512, the controller 205 determines that the operator has previously selected a reference point, then the controller 205 compares the current position to the stored position of the reference point to obtain an offset distance, as shown at step 520. The offset distance is the distance between the stored position and the current position of the implement arm 106. At a step 522, the controller 205 displays the offset distance to a machine operator through the display 210. At a step 524, the flow chart ends.

Because the method 500 may be continually performed, the offset distance may be shown in real-time. In one embodiment, the method 500 operates as a sequence, starting at timed intervals, such as, for example, every 0.10 seconds. Accordingly, the method 500 may restart at step 504 at each timed interval, and run through the steps 504 to 514 if the operator is not currently selecting a reference point, through steps 504 to 516 if the operator is currently selecting a reference point, and through steps 504 to 524 if the operator has already selected a reference point.

Using direct measurement to obtain necessary elements of angular rotation may reduce the amount of computing power required to calculate the offset distance in real-time. This is because the controller 205 is not required to conduct the static equilibrium analysis, thereby simplifying the processing of the information relating to the position of the work implement 106. Furthermore, the direct measurement method may simplify the programming of the controller 205. This may result a decrease in manufacturing costs.

It is often necessary to measure a distance between two points when using an excavator, backhoe, or other work machine. The described system enables an operator to accurately and quickly determine this distance. By considering the angular rotation of the implement arm due to the pin clearance effects at the pin joints when determining the depth or the horizontal distance of an excavation, a more accurate movement distance may be determined than was previously obtainable. Although the method is described with reference to a work machine 100, such as an excavator or backhoe, the system could be used on any machine having a linkage or component that is pinned together at joints, and may also be used to calculate the position of a linkage having shifting components caused by clearance between parts other than pin connections.

Other embodiments will be apparent to those skilled in the art from consideration of the specification and practice disclosed herein. It is intended that the specification and examples be considered as exemplary only, with a true scope of the disclosure being indicated by the following claims.

What is claimed is:

1. A control system for determining a position of an implement arm having a work implement, the implement arm having mating components connected by at least one joint, comprising:

at least one position sensor operably associated with the implement arm and configured to sense positional aspects of the implement arm;

at least one load sensor operably associated with the implement arm and configured to sense the direction of loads applied to the at least one joint; and a controller adapted to calculate a position of the implement arm based on signals received from the at least one position sensor and the at least one load sensor, the calculated position taking into account shifting of the implement arm caused by clearances existing at the at least one joint between the mating components of the implement arm.

2. The control system of claim 1, wherein the mating components are connected by a pin connection at the at least one joint and the clearances existing between the mating components include a pin clearance at the pin connection.

3. The control system of claim 2, wherein the mating components of the implement arm include:

a boom;

a stick attached at a stick joint to the boom; and a work implement attached at a work implement joint to the stick.

4. The control system of claim 1, wherein the controller is adapted to take into account the shifting by determining an angular rotation of the mating components of the implement arm caused by the clearances.

5. The control system of claim 1, wherein the controller is adapted to determine a first calculated position and a second calculated position and determine a movement distance of the implement arm by comparing the first calculated position with the second calculated position.

6. The control system of claim 5, further including a display configured to show the movement distance.

7. The control system of claim 1, wherein the load sensor is a strain gauge associated with a pin at the at least one joint.

8. The control system of claim 7, wherein the load sensor is at least two strain gauges associated with the pin, the two strain gauges being offset by 90 degrees.

9. The control system of claim 8, wherein the controller is adapted to take into account the shifting by determining the direction of shifting based on the signals received from the two strain gauges and adapted to determine an angular rotation of the mating components of the implement arm caused by the clearances.

10. A method for determining a position of an implement arm having a work implement, the implement arm having mating components connected by at least one joint, comprising:

sensing a positional aspect of the implement arm with a position sensor;

sensing a directional aspect of loads applied to the at least one joint with a load sensor; and calculating a position of the implement arm based on signals received from the position sensor and the load sensor, wherein calculating the position includes taking into account shifting of the implement arm caused by clearances existing at the at least one joint between the mating components of the implement arm.

11. The method of claim 10, wherein the mating components are connected by a pin connection and the clearances existing between the mating components include a pin clearance at the pin connection.

12. The method of claim 10, wherein taking into account the shifting includes determining an angular rotation of the mating components of the implement arm caused by the clearances.

13. The method of claim 10, further including:

determining a first calculated position;

determining a second calculated position; and determining a movement distance of the implement arm by comparing the first calculated position with the second calculated position.

14. The method of claim 13, further including displaying the movement distances of the implement arm to an operator.

15. The method of claim 14, further including displaying the movement distances of the implement arm in real-time.

16. The method of claim 13, further including determining the movement distance on board a work machine.

17. The method of claim 10, wherein the load sensor is a strain gauge associated with a pin at the at least one joint.

18. The method of claim 17, wherein the load sensor is at least two strain gauges associated with the pin, the two strain gauges being offset by 90 degrees.

19. The method of claim 18, wherein taking into account shifting includes:

determining the direction of shifting based on the signals received from the two strain gauges; and determining an angular rotation of the mating components of the implement arm caused by the clearances.

20. A method for determining a position of an implement arm having a work implement, the implement arm having mating components connected at joints, comprising:

sensing a positional aspect of the implement arm with a position sensor;

sensing a directional aspect of loads applied to the joints with a load sensor;

determining an angular rotation of the mating components of the implement arm due to shifting at the joints caused by clearances between the mating components of the implement arm;

calculating a first position of the implement arm based on signals received from the position sensor and the load sensor, wherein calculating the first position includes taking into account the shifting at the joints between the mating components;

storing the calculated first position;

calculating a second position of the implement arm, wherein calculating the second position includes taking into account the shifting at the joints between the mating components;

obtaining a movement distance of the implement arm by comparing the first position of the implement arm with the second position of the implement arm; and displaying the movement distance to an operator in real-time.

* * * * *

UNITED STATES PATENT AND TRADEMARK OFFICE

CERTIFICATE OF CORRECTION

PATENT NO. : 6,934,616 B2
DATED : August 23, 2005
INVENTOR(S) : Stephen (NMI) Colburn It is certified that error appears in the above-identified patent and that said Letters Patent is hereby corrected as shown below:

Column 12,
Lines 62 and 65, delete "distances" and insert -- distance --.

Signed and Sealed this

Eighteenth Day of October, 2005

JON W. DUDAS
*Director of the United States Patent and Trademark Office*